United States Patent [19]

Burnham

[11] Patent Number: 5,233,379
[45] Date of Patent: Aug. 3, 1993

[54] DUST PURGING METHOD AND APPARATUS FOR DEPLOYING LENS CAMERAS

[75] Inventor: William L. Burnham, Leroy, N.Y.

[73] Assignee: Eastman Kodak Company, Rochester, N.Y.

[21] Appl. No.: 848,750

[22] Filed: Mar. 10, 1992

[51] Int. Cl.⁵ .............................................. G03B 17/04
[52] U.S. Cl. ...................................... 354/187; 354/64
[58] Field of Search ................................... 354/187, 64

[56] References Cited

U.S. PATENT DOCUMENTS 4,931,816  6/1990  Kamo et al. ........................ 354/64
5,070,348  12/1991 Hayakawa et al. ................. 354/64

Primary Examiner—Michael L. Gellner
Assistant Examiner—J. K. Han
Attorney, Agent, or Firm—Hodgson, Russ, Andrews, Woods & Goodyear

[57] ABSTRACT

A method and apparatus for purging particulate contaminants such as dust from a camera interior chamber and leak paths in the camera housing between the chamber and the atmosphere external to the housing. The camera is of the type having an operational component such as a deploying lens movable in the chamber in a manner varying the volume of the chamber. A passage in the housing provides an air flow path for placing the chamber in fluid communication with the atmosphere. Free flow of air is provided through the path from the atmosphere to the chamber at minimal pressure differential therebetween when the camera operational component moves in a direction increasing the volume of the chamber. The air flow through the path is filtered to remove particulate contaminants such as dust. Flow of air through the path from the chamber to the atmosphere is blocked by a valve when the camera operational component moves in a direction decreasing the volume of the chamber so that air is forced from the chamber through the leak paths in the housing into the atmosphere thereby purging the chamber and leak paths of particulate contaminants such as dust.

10 Claims, 2 Drawing Sheets

DUST PURGING METHOD AND APPARATUS FOR DEPLOYING LENS CAMERAS

BACKGROUND OF THE INVENTION

This invention relates to the camera art, and more particularly to a new and improved apparatus and method for purging particulate contaminates from the housing and interior of a camera.

One area of use of the present invention is in cameras with deploying lenses, although the principles of the present invention can be variously applied. Cameras with deploying lenses store the lens in the air space, i.e. backframe, behind the picture-taking lens position. When the lens is deployed, air enters the backframe through cracks and seams in the camera body. Other cameras including those of the single lens reflex type have zoom lenses, flash reflectors or view finders which displace air as they move in and out.

When the camera is carried in a pocket, dust collects in grooves and cracks in the camera body. When the lens is deployed, air is sucked into the camera backframe. This rush of air pulls the collected dust into the camera and onto the mechanism, viewfinder, taking lens and film. This dust causes veiling glare in the viewfinder and taking lens, creates spots on the film and resultant photos and may jam the mechanism. Other cameras with zoom lenses, flash reflectors or viewfinders which deploy will also have this problem.

SUMMARY OF THE INVENTION

It is, therefore, a primary object of this invention to provide a new and improved method and apparatus for preventing accumulation of particulate contaminants such as dust in the housing and interior of a camera.

It is a more particular object of this invention to provide such a method and apparatus in cameras of the deploying lens type.

It is a further object of this invention to provide such a method and apparatus which is simple in structure and operation, and efficient and effective in solving the problem of dust accumulation in cameras of the deploying lens type.

The present invention provides a method and apparatus for purging particulate contaminants such as dust from a camera interior chamber and leak paths in the camera housing between the chamber and the atmosphere external to the housing. The camera is of the type having an operational component movable in the chamber in a manner varying the volume of the chamber. A passage means in the housing provides an air flow path for placing the chamber in fluid communication with the atmosphere. Free flow of air is provided through the path from the atmosphere to the chamber at minimal pressure differential therebetween when the camera operational component moves in a direction increasing the volume of the chamber. The air flow through the path is filtered to remove particulate contaminants such as dust. Flow of air through the path from the chamber to the atmosphere is blocked by valve means when the camera operational component moves in a direction decreasing the volume of the chamber so that air is forced from the chamber through the leak paths in the housing into the atmosphere thereby purging the chamber and leak paths of particulate contaminants such as dust. The method and apparatus is particularly suited for cameras with deploying lenses including zoom lenses, flash reflectors or viewfinders.

The foregoing and additional advantages and characterizing features of the present invention will become more clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENTS

Figure 1:
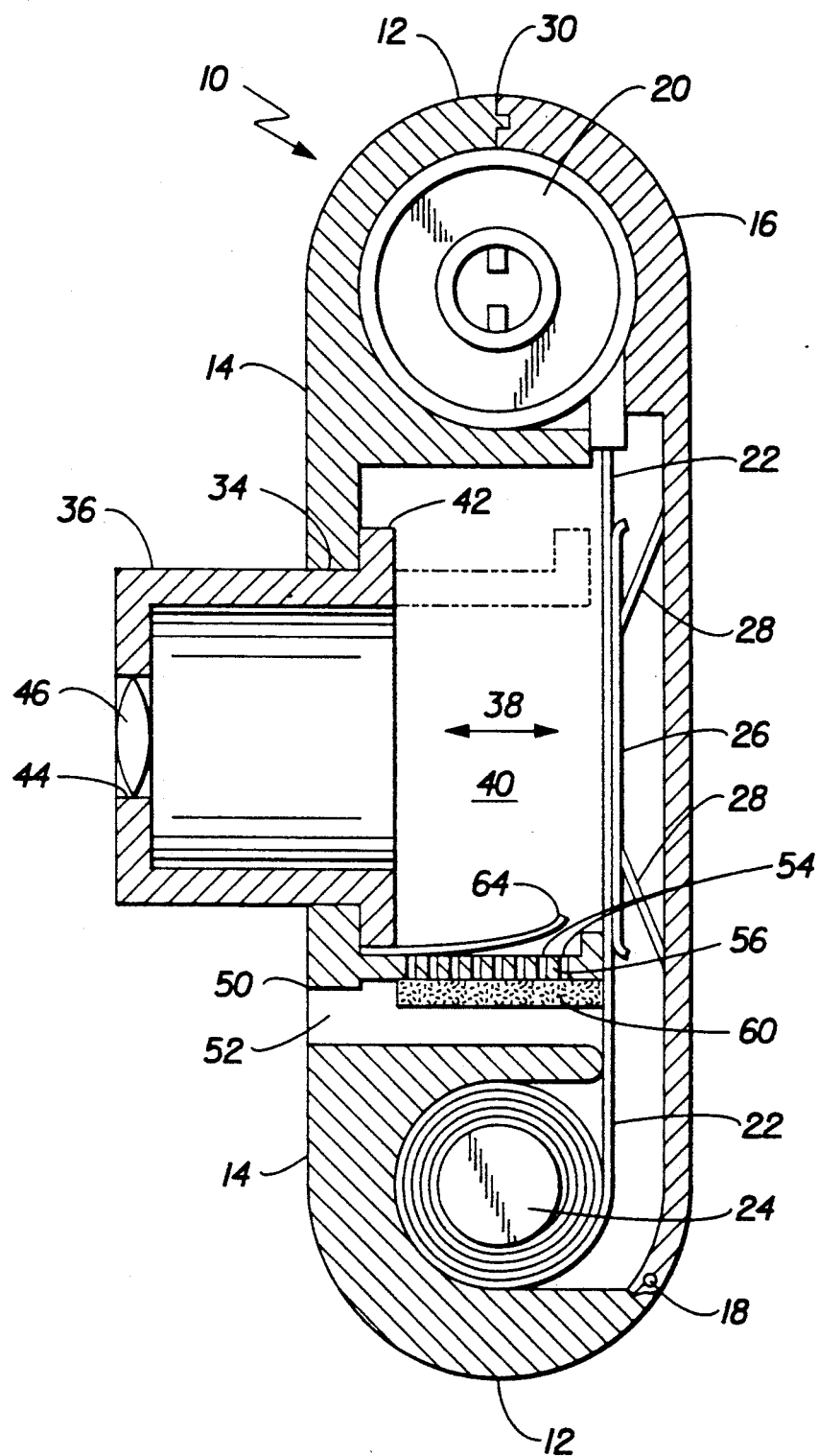
FIG. 1 is a longitudinal sectional view with parts removed of a deploying lens camera illustrating the dust purging method and apparatus of the present invention.

Referring to FIG. 1, there is shown in section a camera 10 illustrating the method and apparatus of the present invention. Camera 10 comprises a body or housing 12 having a front wall 14 and a rear wall including a door 16 pivotally connected to the body of housing 12 by a hinge 18. A film supply reel 20 is movably rotatably received in housing 12 at one end thereof in a known manner. Film 22 extends from the supply reel 20 along a path within housing 12 substantially parallel to the housing rear wall to a take-up reel 24 rotatably connected in the opposite end of housing 12. Film 22 is supported or backed within an open portion of housing 12 by a film platen 26 which is urged toward film 22 by a spring 28 supported by the housing rear wall. The hinged connection 18 of door 16 to housing 12 is configured to provide a light seal in a known manner. Similarly, the removable engagement between the other end of door 16 and housing 12 is configured to provide a light seal in a known manner.

The illustrative camera 10 is of the deploying lens type, an example being a Konica A4 camera. Cameras with deploying lenses store the lens in the air space, i.e. backframe, behind the picture taking lens position. When the lens is deployed, air enters the backframe through cracks and seams in the camera body. Other cameras including single lens reflex cameras have zoom lenses, flash reflectors or viewfinders which displace air as they move in and out. As shown in FIG. 1, a central opening 34 is provided in housing front wall 14 in which opening a cylindrical lens holder 36 is movable in the direction of arrows 38 between a fully extended picture-taking position shown in solid lines in FIG. 1 and a retracted position shown in broken lines. To this end, camera 10 has an open interior region or chamber 40 to receive holder 36 and accommodate movement thereof, chamber 40 being defined between housing front wall 14, the camera backframe and the opposite end portions of housing 12 containing the supply and take-up reels 20 and 24, respectively. Holder 36 is hollow cylindrical in shape, being provided with an annular skirt or flange 42 around the inner end thereof as shown in FIG. 1 which serves to limit the extent of movement outwardly of housing 12 by engagement with the inner surface of front wall 14 surrounding opening 34. The outer axial end wall of holder 36 is provided with a central opening 44 for receiving the picture-taking lens 46 of camera 10.

When the camera 10 is carried in a pocket, dust collects in grooves and cracks in the camera body or housing 12. When the lens 46 is deployed, i.e. holder 36 extended to the solid line position of FIG. 1, the volume of chamber 40 increases and air is sucked into the camera chamber 40 and backframe. This rush of air pulls the collected dust into the camera and onto the mechanism, viewfinder, taking lens and film. This dust causes veiling glare in the viewfinder and taking lens, creates spots on the film and resultant photos, and may jam the mechanism. Other cameras with zoom lenses, flash reflectors or viewfinders which deploy and thus change the volume of an internal region during zooming, opening or picture taking will have these problems too.

The foregoing problem is solved by the present invention in the following manner. There is provided a free flow air passage connecting the camera region 40 and backframe with the outside of the camera. The passage is defined by means of an opening 50 in housing front wall 14, an internal passage 52 defined in housing 12 communicating with opening 50 and a series of bores or openings 54 in a housing interior wall 56 placing passage 52 in communication with chamber 40. The passage is provided with an air filter means 60. In the present illustration, filter means 60 is located in the passage means, being in the form of a layer or sheet of filter material extending along the surface of inner wall 56 between passage 52 and bores 54. The air filter 60 and labyrinths in the air passage prevent light from entering the backframe and fogging the film. The air passage also is provided with valve means in the form of a one-way flapper valve 64 which prevents air from flowing out through the air passage. This system can be used for zooms, flashes or viewfinders.

When the lens 46 is deployed, i.e. when holder 36 is moved to the solid line position of FIG. 1 thereby increasing the volume of chamber 40, the free flow air passage allows air to enter the chamber 40 and backframe easily without much pressure differential. Not much air is drawn in through the cracks and seams of the camera body or housing 12. That is because opening 50, passage 52 and bores 54 are dimensioned to have a flow area significantly larger than that of the leak paths in housing 12. The filter 60 prevents dust from entering the backframe through the air passage. The reduced pressure, due to the free flow air passage, reduces the influx of dust through the cracks and seams in the camera body. When the lens 46 is retracted, air must leave the chamber 40 and backframe of the camera. The flapper valve prevents the air from flowing out the air passage. The pressure builds up and the air flows out through the leak paths provided by the cracks and seams in the camera houring 12 blowing out any dust which may have collected. Thus, the camera actively purges itself of dust. The problem is solved by zooms, flashes and viewfinders in the same fashion.

The method and apparatus of the present invention, in providing the free flow air passage at reduced pressure, advantageously prevents dust and other particulate contaminants from being drawn into the camera interior region 40 and backframe when the lens 46 or like camera operational component is deployed. When the lens or like component is retracted, the forcing of air from the camera interior and backframe through leak paths including grooves and cracks in the camera housing 12 advantageously expels dust and particulates from those cracks and crevices as well as from the camera interior and backframe. The foregoing advantages are provided in a simple, economical and effective manner.

One form of filter means 60 can be of the paper-like filter material formed in automobile air filters. Alternatively a suitable foam filter material can be employed. The only requirement on the filter material is that it trap dust size particles. Additional alternatives can include air pervious material to which dust and like materials adhere, or a labyrinth structure capable of trapping dust size particles.

The free flow air passage must not allow entry of light to any location in camera 10 which will damage the film or otherwise interfere with the picture-taking process. To this end, filter means 60 can be of opaque material. Another approach, alone or in combination with an opaque filter, is to orient the passage 52 and openings 54 in a manner blocking entry of light.

Figure 2:
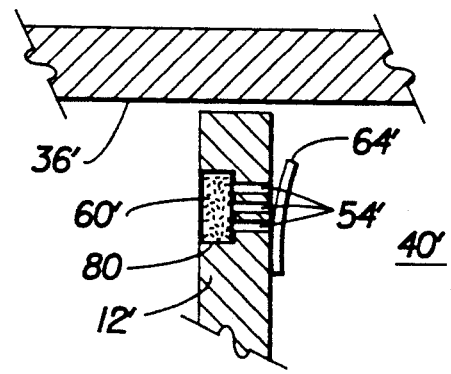
FIG. 2 is a diagrammatic view of an alternative valve and filter arrangement according to the present invention.
Figure 3:
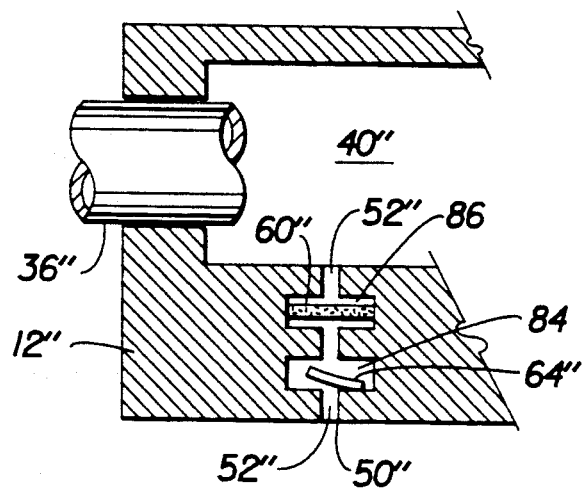
FIG. 3 is a diagrammatic view of another alternative valve and filter arrangement according to the present invention.
Figure 4:
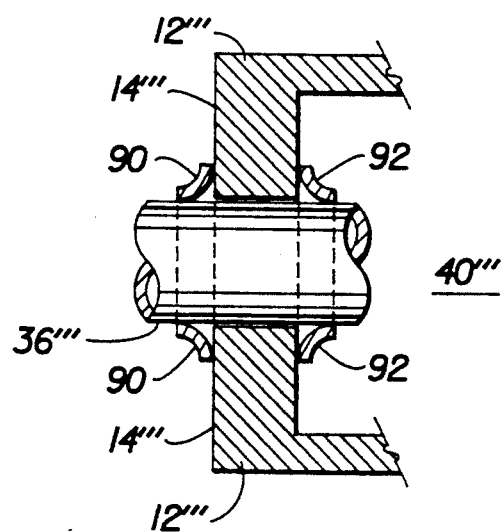
FIG. 4 is a diagrammatic view of a further alternative valve and filter arrangement according to the present invention.

FIGS. 2–4 illustrate some alternative forms and arrangements of the filter means and valve means. In the arrangement of FIG. 2, filter 60' is positioned in a recess 80 in housing 12', bores 54' are provided in the adjacent portion of the housing wall behind recess 80 and filter 60', and valve 64' is attached to the inner surface of housing 12' adjacent openings 54'. The chamber 40' is in communication with the inner surface of housing 12' containing bores 54' and valve 64'. The operation of filter 60' and valve means 64' during movement of component 36' varying the volume of chamber 40' is similar to the arrangement of FIG. 1.

FIG. 3 illustrates a different positional relationship between filter means 60'' and valve means 64''. An opening 50'' in housing 12'' communicates with one end of a passage 52'', the other end of which is in communication with camera chamber 40''. Passage 52'' includes a first chamber 84 containing valve means 64'' and a second chamber 86 spaced from chamber 84 along passage 52'' and containing filter means 60''. When component 36'' moves in a direction increasing the volume of chamber 40'', air flows into passage 52'' through opening 50'', through valve 64'' and through filter 60'' into chamber 40''. As in the embodiment of FIG. 1, the cross-sectional area of passage 52'' is sufficient to provide free flow of air at minimal pressure differential between the external atmosphere and chamber 40''. When component 36'' moves in a direction decreasing the volume of chamber 40'', air flow to opening 50'' is blocked by valve 64'' and air is forced through cracks and crevices and other leak paths in housing 12'' thereby purging the camera of dust and similar particulate contaminants in a manner similar to the embodiment of FIG. 1.

In the embodiment of FIG. 4, the free flow-air passage is defined by the space between cylinder 36''' and housing 12'''. An annular, wiper-like element 90 serves as a filter and is attached to the outer surface of housing wall 14''' around opening 34''' and is in sliding, wiping contact with cylinder 36'''. Element 90 is of any suitable material which filters or traps dust-like particles. Another annular, wiper-like element 92 serves as a valve and is attached to the inner surface of housing 12''' around opening 34''' and is in sliding, wiping contact with cylinder 36'''. Element 92 is of fluid impervious material and flexes in response to flow of air thereagainst. When cylinder 36''' moves in a direction increasing the volume of chamber 40''', air flows through filter 90 between cylinder 36''' and housing 12''' flexing element 92 inwardly so that air flow into chamber 40''' results. The defined passage is of sufficiently large cross-sectional area to provide minimal pressure differential as in the embodiment of FIG. 1. When cylinder 36''' moves in a direction decreasing the volume of chamber 40''', air flow is blocked by element 92 and air is forced through cracks and crevices and other leak paths in housing 12''' thereby purging the camera of dust and similar particulate contaminants in a manner similar to the embodiment of FIG. 1.

It is therefore apparent that the present invention accomplishes its intended objects. While embodiments of the present invention have been described in detail, that is for the purpose of illustration, not limitation.

What is claimed is:

1. In a camera including a housing, a chamber defined in said housing and a camera operational component movable in said chamber in a manner varying a volume of said chamber:
    a) passage means in said housing for placing said chamber in fluid communication with an atmosphere external to said housing in a manner allowing free flow of air from the atmosphere into said chamber;
    b) filter means operatively associated with said passage means for trapping particulate contaminants such as dust in the flow of air into said chamber; and
    c) valve means operatively associated with said passage means for allowing air flow in a direction from the atmosphere into said chamber but preventing air flow in a direction from said chamber to the atmosphere;
    d) so that when said camera operational component moves in a direction increasing the volume of said chamber air flows from the atmosphere through said passage means and said filter means into said chamber and when said component moves in a direction decreasing the volume of said chamber air flow through said passage means is blocked and air flow is forced from said chamber through leak paths in said housing to the atmosphere thereby expelling any accumulated particulate contaminants such as dust from the camera to the atmosphere.

2. Apparatus according to claim 1, wherein said passage means has sufficient flow area so as to allow air to flow into said chamber with minimal pressure differential between said chamber and the atmosphere so that minimal air flow results through said leak paths.

3. Apparatus according to claim 1, wherein said passage means has a structure and said filter means has a location which co-operate to block entry of light to said chamber.

4. Apparatus according to claim 1, wherein said filter means extends across said passage means and said valve means is located between said filter means and said chamber.

5. Apparatus according to claim 4, wherein said filter means is of opaque material.

6. Apparatus according to claim 1, wherein said camera is a deploying lens type having a backframe, said camera operational component is a deploying lens and said chamber is associated with the camera backframe.

7. In a camera including a housing, a chamber defined in said housing, a camera operational component movable in said chamber in a manner varying a volume of said chamber, and leak paths in said housing between said chamber and an atmosphere external to said housing, a method for purging particulate contaminants such as dust from said chamber and leak paths comprising:
    a) providing an air flow path for placing said chamber in fluid communication with the atmosphere external to said housing;
    b) providing free flow of air through said path from the atmosphere to said chamber at minimal pressure differential between said chamber and the atmosphere when said camera operational component moves in a direction increasing the volume of said chamber;
    c) filtering the flow of air through said path from the atmosphere to said chamber to remove particulate contaminants such as dust; and
    d) blocking the flow of air through said path from said chamber to the atmosphere when said camera operational component moves in a direction decreasing the volume of said chamber;
    e) so that air is forced from said chamber through said leak paths in said housing when said camera operational component moves in a direction decreasing the volume of said chamber thereby purging particulate contaminants such as dust from said chamber and said leak paths.

8. In a camera including a housing, a chamber defined in said housing, a camera operational component movable in said chamber in a manner varying a volume of the chamber, and at least one air leak path in said housing between said chamber and an atmosphere external to said housing:
    a) passage means in said housing for placing said chamber in fluid communication with the atmosphere in a manner allowing free flow of air from the atmosphere to said chamber at a minimal pressure differential between the atmosphere and said chamber;
    b) filter means operatively associated with said passage means for trapping particulate contaminants such as dust in the flow of air into said chamber;
    c) said passage means co-operating with said filter means to prevent light from entering said chamber; and
    d) valve means operatively associated with said passage means for allowing air flow in a direction from the atmosphere into said chamber but preventing air flow in a direction from said chamber to the atmosphere;
    e) so that when said camera operational component moves in a direction increasing the volume of said chamber air flows from the atmosphere through said passage means and said filter means into said chamber and minimal air flows through said leak path and when said component moves in a direction decreasing the volume of said chamber air flow through said passage means is blocked and air flow is forced from said chamber through said leak path to the atmosphere thereby expelling any accumulated particulate contaminants such as dust from the camera to the atmosphere.

9. Apparatus according to claim 8, wherein said camera is a deploying lens type having a backframe, said camera operational component is a deploying lens and sa chamber is associated with the camera backframe.

10. Apparatus according to claim 8, wherein said filter means extends across said passage means and is of opaque material.

* * * * *